United States Patent
Craver

(10) Patent No.: US 6,529,554 B1
(45) Date of Patent: Mar. 4, 2003

(54) LOW BRANCH-MISPREDICT TECHNIQUE FOR MPEG RUN LENGTH ENCODING

(75) Inventor: Thomas R. Craver, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 09/606,643

(22) Filed: Jun. 29, 2000

(51) Int. Cl.[7] .................................................. H04N 7/50
(52) U.S. Cl. ........................... 375/240.23; 348/423.1; 375/340.12; 712/300
(58) Field of Search ................. 375/240.23, 240.12; 348/423.1; 712/300, 22; H04N 7/50

(56) References Cited

U.S. PATENT DOCUMENTS 5,757,432 A * 5/1998 Dulong et al. ........... 348/423.1
6,115,812 A * 9/2000 Abdallah et al. ........... 712/300

OTHER PUBLICATIONS

Mangione–Smith, William H., Subword extensions for video processing on mobile systems, IEEE Concurrency, Jul.–Sep. 1998, pp. 13–16.*

* cited by examiner

Primary Examiner—Howard Britton
(74) Attorney, Agent, or Firm—Blakely, Sokoloff, Taylor & Zafman LLP

(57) ABSTRACT

A technique to provide low branch-mispredict for MPEG run length encoding. Packed data instructions are used to reorder data when loading into registers. A bitmask is then created to identify zero and non-zero values. An index is generated from the bitmask and locations of the non-zero values are determined. Subsequently, the run-length of the zeros are calculated to encode the data for output based on one of the MPEG standards.

30 Claims, 8 Drawing Sheets

LOW BRANCH-MISPREDICT TECHNIQUE FOR MPEG RUN LENGTH ENCODING

BACKGROUND OF THE INVENTION

1. Field of the Invention

The present invention relates to the field of encoding data using a computer and more specifically to reducing branch mispredicts on MPEG run length encoding.

2. Description of the Related Art

MPEG, which stands for "Moving Picture Experts Group," is a generic technique of compactly representing digital, video and audio signals for consumer distribution. In general terms, MPEG transforms a stream of discreet samples into an encoded bit stream which is then transferred through a medium. The transferred medium can be a communications link, such as a modem, a network (such as the Internet), a storage device (such as a compact disc), etc. The MPEG syntax provides an efficient method to represent image sequences in the form of more compact coded data. This compactness allows images to be transferred in digital format in less actual bytes of data than that required for the actual viewing of the video picture. MPEG1, MPEG 2 and the more recent MPEG 4 video standards are known in the art.

Once the MPEG data is transferred, the recipient can then decode the encoded data to replicate the original stream of discreet video samples. For example, a digital video disc (DVD) is an optical disk storage technology which is used to store motion video (such as movies) on a DVD compact disc. Using an MPEG specification, such as the MPEG 2 (Moving Picture Experts Group, Standard 2), the decoded video frames can be displayed on a computer monitor or on a television screen (such as high definition television, HDTV). Another example of the use of MPEG video is the transfer of video information over the Internet in which motion video can be downloaded and displayed on a computer monitor. In these multimedia applications, the audio generally accompanies the video data.

MPEG video encoding, as well as other techniques of video encoding, has processing stages which are referred to as quantization and run-length encoding. For example, a block of pixel data is typically transformed using an algorithm, such as Discrete Cosine Transform (DCT), to generate a block of coefficients which is subsequently compactly encoded by the use of a quantization process. When a particular transform, such as the DCT, is used to generate the coefficients, many of the coefficients quantize to a value of zero or near zero. Such zero or near zero values are commonly encoded as a count or run-length of sequential coefficients quantized to zero so that the encoded data includes only the non-zero coefficients and the number of sequential zeros preceding or following the non-zero coefficient value.

Since DCT coefficients representing a block of data will more commonly have zeros in the lower right portion of the coefficient block, some form of "zigzag" scanning order is used to sequence the coefficients for run-length encoding. Non-zero coefficients are infrequent enough that generally a run number of zero values will separate the non-zero coefficients. The encoding compresses the run-length of quantized zeros (zero and near-zero coefficients) between the non-zero coefficients. For example, if two non-zero quantized coefficients are separated by twenty-three zeros, then a run-length of twenty-three will be inserted between the two non-zero quantized coefficient values. If two sequential non-zero quantized coefficients are found without an intervening zero between them, then a run length of zero coefficients will be inserted between them. Essentially, the number of sequential zero coefficients are translated into a run-length, instead of providing the actual zero quantized value. In this way, only the non-zero quantized coefficients are transferred along with the run-length of zero coefficients after the encoding.

The zigzag scanning known in the art utilizes a zigzag order look-up table that specifies the sequential order in which to read the coefficients in order to achieve the zigzag scan order. One disadvantage with this technique is that it does a conditional test and branch for each of the coefficients in a data block. This conditional branch is largely unpredictable as to whether it will be taken or not taken. On deeply pipelined processors, it is common practice to attempt to guess or predict which way a branch will go, rather than waiting for all previous instructions upon which the condition depends to complete. If the processor guesses incorrectly regarding the branch, the misprediction typically will use a pipeline flush to discard the incorrect data and the pipeline will need to be replayed from a point prior to the misprediction. In highly pipelined processor architecture, the misprediction results in a significant performance penalty. With the zigzag scanning technique, it is possible that the conditional branch will mispredict for nearly every non-zero coefficient and possibly also for some zero coefficients.

The present invention addresses these concerns.

DETAILED DESCRIPTION OF THE INVENTION

Figure 1:
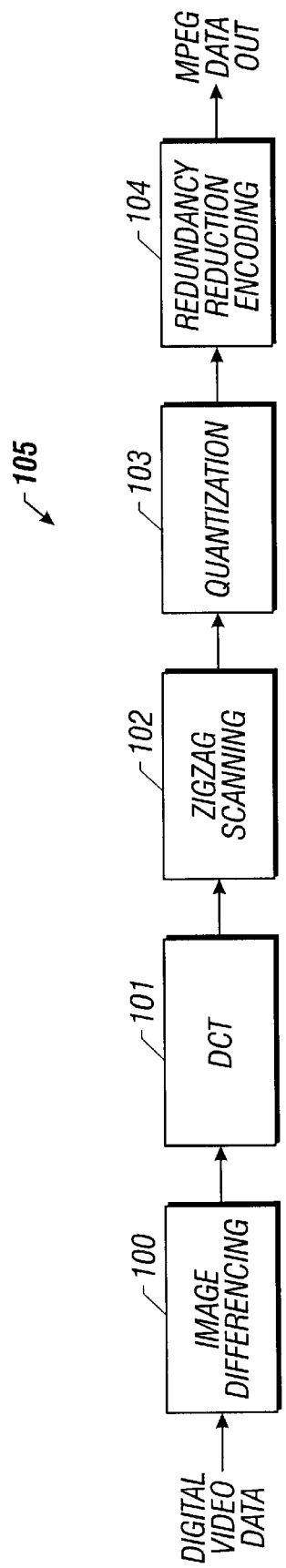
FIG. 1 shows a block schematic diagram of a technique to encode video data to generate MPEG data out.

Referring to FIG. 1, a block diagram 105 is shown in which digital video data is encoded and compressed to generate an output. The one embodiment shown in FIG. 1 encodes digital video data to output data in a compressed format in accordance with a standard, such as one of the MPEG standards (such as MPEG1, MPEG2 or MPEG4). The encoding scheme utilizes a transformation algorithm (shown as block 101) which receives the digital video data input and transforms the data. Typically, the video data is subjected to image differencing (shown in block 100) prior to the encoding. Part of MPEG is to find blocks of pixels in a previously decoded frame that closely match the block being encoded. A difference is taken between the old and new block before encoding, which increases the number of "zeroes" after encoding is performed.

For encoding in the particular embodiment shown, a Discrete Cosine Transform, DCT, (or some other equivalent algorithm) transforms a block of pixel data (data elements) into a block of coefficients. The output of the DCT block 101 is reordered by performing zigzag scanning (shown in block 102). Subsequently, the reordered coefficients are quantized in the quantization block 103 prior to encoding. It is appreciated that the operation performed by the zigzag scanning block 102 and quantization block 103 can be performed in either sequence or in parallel, in order to reorder and quantize the DCT coefficient output from the DCT block 101. Then, the reordered and quantized data is encoded by the redundancy reduction encoding block 104, in which encoding is performed to compress the video data to generate the MPEG data output.

Each of the blocks 100–104 is further described in more detail in reference to the other figures. Additionally, the description below describes data in terms of video data; however, it is understood that other data may be included as well. For MPEG syntaxed data, the data is comprised of video and audio data. Additionally, although the particular embodiments described herein pertain to MPEG standards, the invention can be adapted for use with other conventions as well. Accordingly, it is appreciated that the invention is not limited to the described embodiments and that the invention can be readily adapted for other uses without departing from the spirit and scope of the invention.

Figure 2:
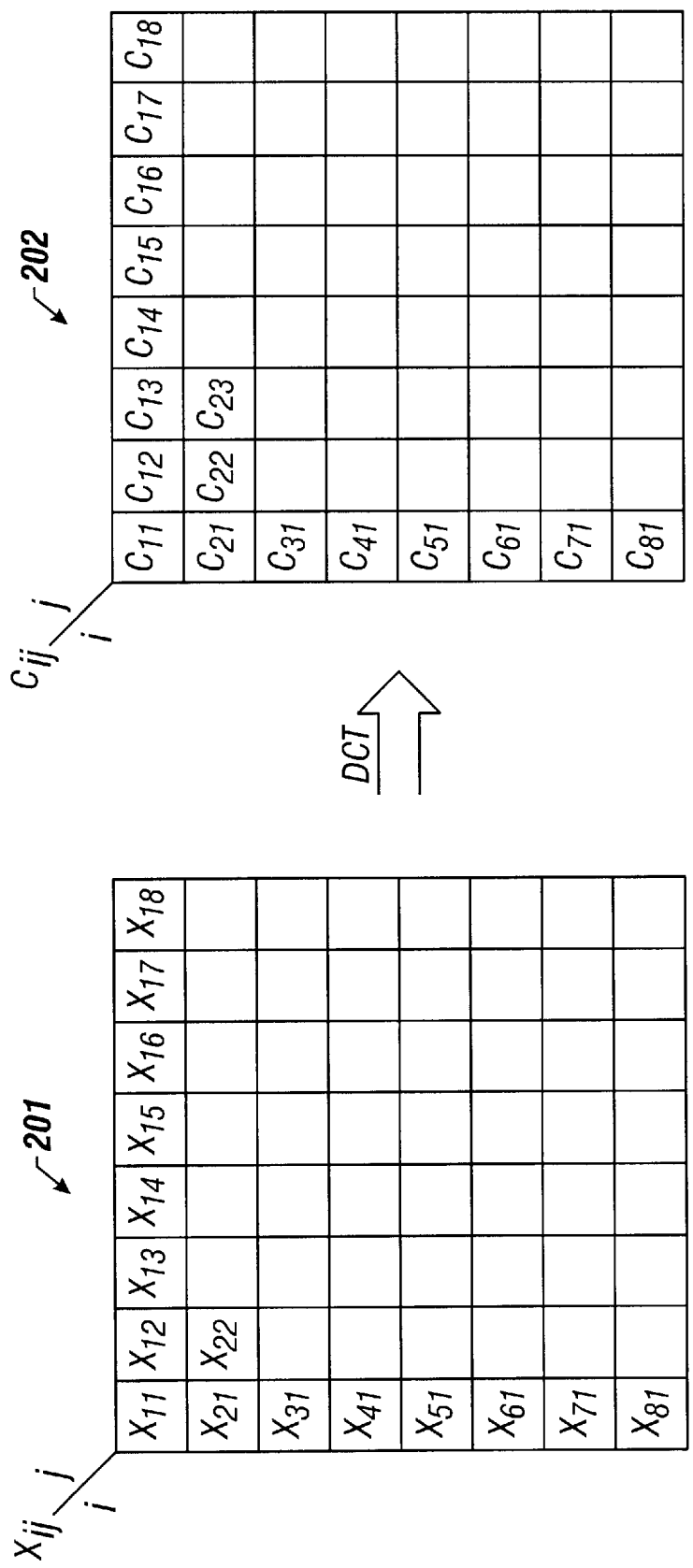
FIG. 2 illustrates the transformation of an 8×8 block of video data to 8×8 block of DCT coefficients when a Discreet Cosine Transform Algorithm is applied to the block of video data.

Referring to FIG. 2, an 8×8 block of pixel (or pel) data is shown in block or array 201. The sixty-four pel data elements are shown arranged by eight rows and eight columns and each denoted by $X_{ij}$ where i denotes a particular row and j denotes a particular column. Thus, the third element in the first row is denoted as $X_{13}$. The sixty-four pixel data are arranged from $X_{11}$–$X_{88}$. Each of the pixel data $X_{ij}$ is represented by a given number of bits, such as 8 bits or 16 bits. The actual number of bits (or bytes) is not critical to the understanding of the present invention and will vary depending on the particular architecture or standard.

Generally, the data of array 201 resides at some storage location and generally linked in the sequence shown. Accordingly, the first byte of pixel data of the 8×8 array 201 is $X_{11}$ followed by $X_{12}$, $X_{13}$ . . . . A Discrete Cosine Transform (DCT) or an equivalent algorithm is then utilized to generate an 8×8 block of coefficients as shown in array (or block) 202. The coefficients are noted as $C_{ij}$ (again the i representing the row and j, the column) so that sixty-four coefficients, shown as $C_{11}$–$C_{88}$ are generated and typically stored in a memory location. The generation of the $C_{ij}$ coefficients by the use of a Discrete Cosine Transform algorithm corresponds to the DCT block 101 of FIG. 1. Again, image differencing (as shown in block 100) is typically used prior to the encoding. A variety of known image differencing techniques can be employed.

Subsequently, as shown in FIG. 1, the coefficients are then reordered (as shown by block 102) and quantized (as shown by block 103), but not necessarily in the order shown. In the particular embodiment shown, partial quantization is used to identify those non-zero and near-zero coefficients. The quantization of the coefficients maps these coefficient values onto a smaller set of values. For example, the coefficient values can be quantized to be represented by a single byte so that the quantized coefficient values stored in the table are a single byte in length. In one example, quantization can map the coefficient values between −128 to +127. The quantized values of the coefficients are stored in a table or array, such as array 202 shown in FIG. 2.

In one embodiment, the quantization on the coefficients are performed to output values of the Discrete Cosine Transform so that the coefficient values stored in array 202 of FIG. 2 are actually quantized coefficient values $C_{ij}$. In another embodiment, non-quantized the coefficient values are stored in the array 202, and some form of quantizing (or partial quantizing) technique is used to identify those coefficients which would be quantized to near-zero. Thus, it is to be noted that the quantization can be performed as the DCT outputs are obtained to load array 202 with quantized coefficient values, or in the alternative, the DCT coefficient values can first be stored in memory and then subsequently quantized at a later time, such as when a scanning operation is performed.

As noted earlier, typically many coefficients quantize to zero or near zero, where these near zero quantized coefficients are regarded as having a coefficient quantized value of zero. Those coefficients which do not quantize to zero are regarded as non-zero coefficients and the values of these non-zero coefficients are later used for encoding the MPEG output. In a DCT transform, many coefficients quantize to near-zero and especially those coefficients in the lower right portion of the 8×8 block shown by array 202.

Figure 3:
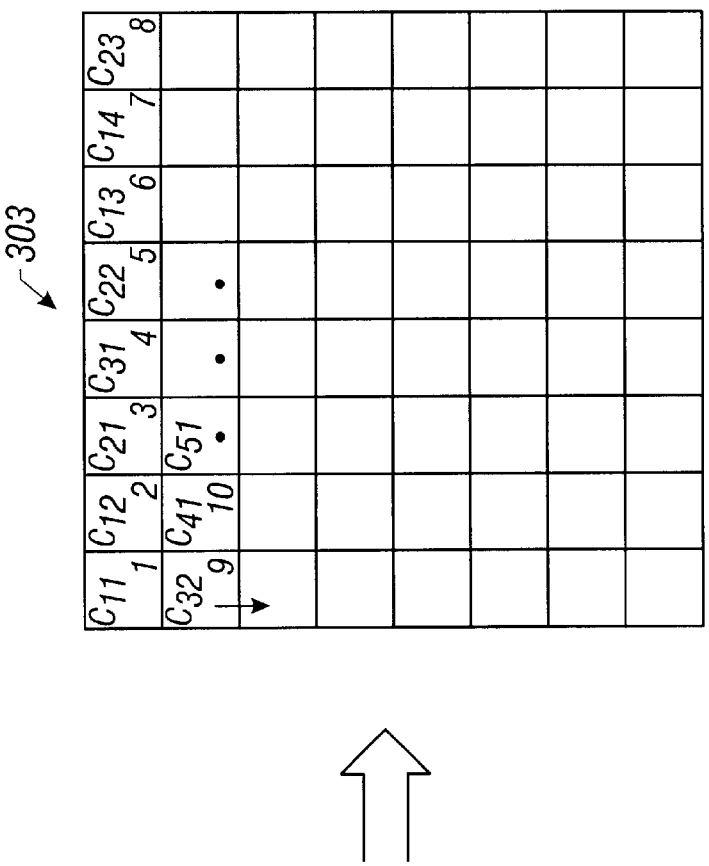
FIG. 3 shows the scanning sequence of the coefficients in order to reorder the sequence of coefficients so that more of the zero coefficients are grouped sequentially together.
Figure 3:
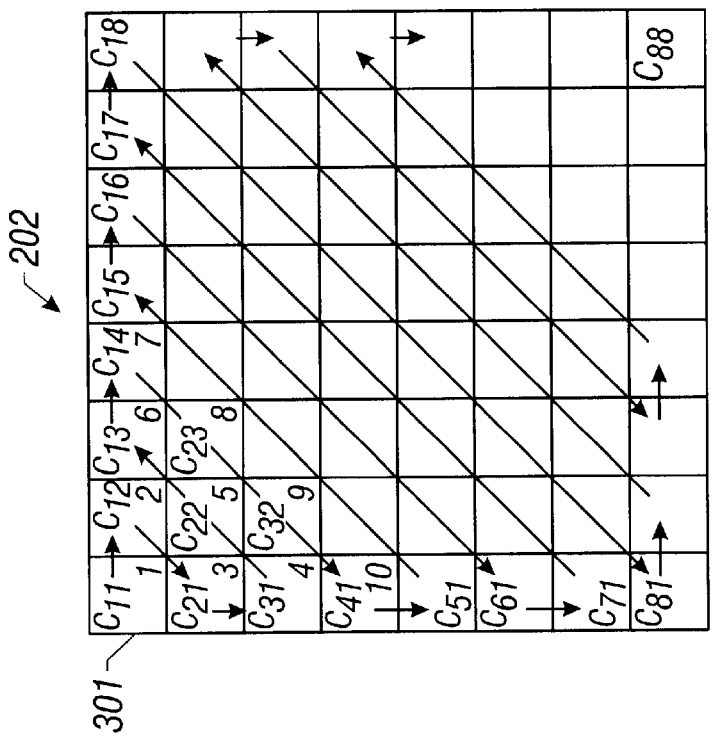

Since zero coefficients (henceforth, near-zero and zero coefficients are referred to as zero coefficients) are more common in the lower right portion of the 8×8 block, a general practice has been to reorder the coefficients so that the zero coefficients can be sequentially placed together. A number of zigzag scanning techniques have been devised to reorder the coefficients of array 202. FIG. 3 illustrates one scanning sequence to reorder the coefficient values so that zero coefficients, especially those toward the lower right portion of the block, are grouped together. The particular scanning order is shown by arrows 301 in FIG. 3.

Each $C_{ij}$ coefficient has been renumbered in the sequence order 1–64 pursuant to the scanning sequence shown by arrows 301. That is, with the embodiment shown, the coefficients are read starting at the top left corner of the 8×8 block and then read in a zigzag pattern back and forth across the diagonal to the lower right corner of the block. For example, the first coefficient value of the scan 301 is $C_{11}$ then followed by $C_{12}$. However the third coefficient to be scanned is $C_{21}$ followed by $C_{31}$. When the coefficients are scanned in this zigzagging sequence, the coefficients would be reordered in a sequence shown in array 303 in FIG. 3.

Again, as noted previously, non-zero coefficients are infrequent enough that commonly a run of sequential zero values will separate non-zero coefficients so that the sequence shown in array 303 will be comprised of few non-zero coefficients which are separated by a run of zero coefficient values.

The zigzag scanning technique is used to reorder the coefficients in order to perform the run-length encoding. A common method of doing a scanning and encoding in the prior art is to read the coefficients one by one in the zigzag order, test each coefficient to see if it is a zero, and if so, incrementing the run-length count. If the coefficient is non-zero it is stored to the output. However, this technique on a computer system typically will take two reads to perform the reordering. The first read (or load operation) is used to reorder the coefficients, in which the reordered coefficients are then stored back in memory. Subsequently, the reordered coefficients are then read from memory in a second read operation to load the registers in order to perform the encoding operation. As noted below, an embodiment of the invention removes the requirement for a second read operation.

Figure 4:
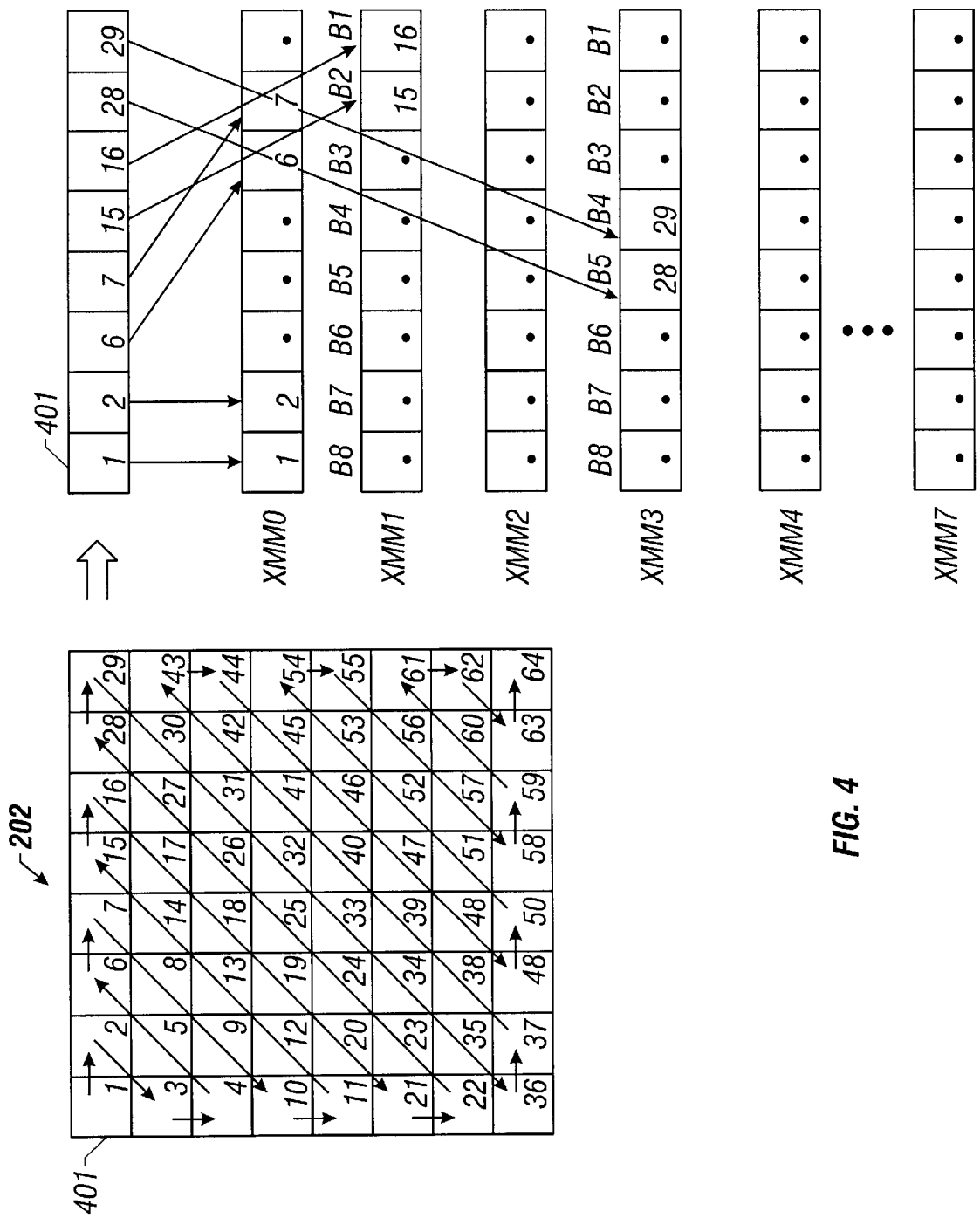
FIG. 4 shows a use of packed data instructions to load data into registers so that the coefficient data is loaded into the registers in a desired scanning order.

Referring to FIG. 4, it shows one embodiment of the invention in performing the zigzag scanning of the coefficients residing in array 202. Once the coefficient values are stored within array 202, one of the zigzag scanning techniques, such as the pattern earlier described in FIG. 3, is utilized to reorder the coefficients sequentially from 1 to 64. In the particular embodiment shown in FIG. 4, the coefficient values are treated as packed data so that packed data instructions are used to perform the reordering of the coefficients 1–64.

It is appreciated that packed data manipulation is known in the art and that recently processors have implemented specialized packed data instructions in order to perform packed data operations. Aside from integer and floating point operations, many processors now perform packed data operations utilizing specialized packed data instructions. In some processors, packed data operations operate on dedicated packed registers, while other processors alias floating point registers to execute packed data instructions and floating point instructions.

An example of a processor which implements aliasing of floating point and packed data is a processor within the Intel Architecture Family of Processors, which includes the Pentium® Processor, manufactured by Intel Corporation of Santa Clara, Calif. Accordingly, in one particular approach, the floating point registers of the processor are also utilized to perform packed data operations. Accordingly, floating point instructions would then perform scalar floating point operations and packed data instructions would then perform packed data operations. Examples of packed data instructions within the Intel Architecture Family include instructions implementing the MMX™ Technology as well as the more recent Single Instruction Multiple Data (SIMD) Extensions™. One advantage of the packed data instructions is that it allows stored bytes to be operated on individually or in packed groups so that specialized packed data instructions can be executed for various data manipulation. The MMX Technology and SIMD Extension examples are utilized herein to describe one embodiment of the invention. However, it is appreciated that other forms of instructions can be readily implemented to perform the data operation required to perform the non-sequential scanning necessary to reorder a given data array.

In the particular example shown in FIG. 4, eight packed data registers XMM0–XMM8 are noted. For example, XMM0–XMM8 registers can be SIMD registers present within a processor of the Intel Architecture Family. In the particular example, each of the XMMx registers is 128 bits in length so that eight coefficients (each coefficient being 16 bits in length) can be loaded into each register. Accordingly, the eight XMM registers can hold all sixty-four coefficients of array 202.

In the embodiment shown in FIG. 4, a sequence of packed data read instructions are used with offsets into the eight XMM registers, rather than reading positions from a look-up table. In this instance, only one read instruction is required for each row of the array to reorder the coefficient values into the XMM registers. Instead of reading indices from a look-up table and using those indices to read and quantize coefficient values one by one, coefficient values can be loaded directly into the XMM registers and re-ordered in the XMM registers to avoid multiple reads from the look-up table.

The example illustration shown in FIG. 4 exemplifies the reading of the first row from the array 202 and the reordering of the coefficients of the first row into the appropriate XMMx register(s). If each byte is processed separately, then eight actual reads will be required of the first row 401 to reorder the bytes using SIMD instructions. However, in some instances where the bytes are already in sequential order, packed byte transfers can be made to the appropriate location so that less number of reads will be required for each row, such as the first row 401.

In the example shown in FIG. 4, first and second ordered coefficients are already together when these two coefficients are loaded into byte positions B8 and B7 of the XMM0 register. The next two coefficients of row 401 will reside at positions 6 and 7 in the scanning order, so that these two bytes are loaded into byte positions B3 and B2 of the register. In subsequent read operations, coefficients which will be placed at positions 15 and 16 are moved to byte positions B2 and B1 of the XMM1 register and coefficients corresponding to the reordered positions 28 and 29 are moved to byte positions B5 and B4 of the XMM3 register.

Upon transferring all sixty-four coefficients of the array 202 to the 64 byte positions of the packed data registers XMM0–XMM7 by performing the reads and shifts of each byte or group of sequential bytes the coefficients of the array 202 will be reordered pursuant to the reorder scheme selected. Thus, zigzag scanning of the coefficients of the array 202 will result in a reordered coefficient sequence 1–64 in the XMM0–XMM7 registers. That is, in the example of FIG. 4, the coefficients are reordered in the zigzag scanning order by performing one set of reads (maximum of sixty-four) to load the packed data registers.

As noted above, when a look-up table is utilized in performing the zigzag scanning pursuant to the prior art technique of reordering the coefficients, a read is required for each coefficient from array 202 to be processed by the look-up table to determine its reorder location, then stored into a reorder array pursuant to its location and then subsequently read from the reorder array into a processing register by a second read operation. Accordingly, in prior art practice, 128 reads are required to reorder and load the registers for the sixty-four coefficients.

In the embodiment described in reference to FIG. 4, a maximum number of 64 reads are required in order to position a particular coefficient to its designated reordered location within the registers. The number of actual reads can be further reduced from a value of 64 if there are sequential coefficients residing in a given read. In the example, since each row is read in a load operation, coefficients which are sequentially located already can be processed as a group so that multiple coefficient values can be transferred to a register position. In the example shown, pairs of bytes (positions 1–2, 6–7, 15–16, and 28–29) are processed together and positioned to the appropriate locations in one operation, instead of two.

It is appreciated that various alternative techniques can be implemented to process the coefficients by packed data operations to perform the reordering. For example, even where there are no sequential values in a given row 401, if a row of the original block contains two or more values that go into the same XMMx register in a zigzag sequential order, the number of reads can still be reduced by loading the entire row to another register and rearranging and copying the contents using packed data instructions. Once the packed data operations are performed on all sixty-four coefficients, the registers XMM0–XMM7 will contain the coefficients in the reordered sequence 1–64. This corresponds to the zigzag scanning shown in block 102 of FIG. 1.

Figure 5:
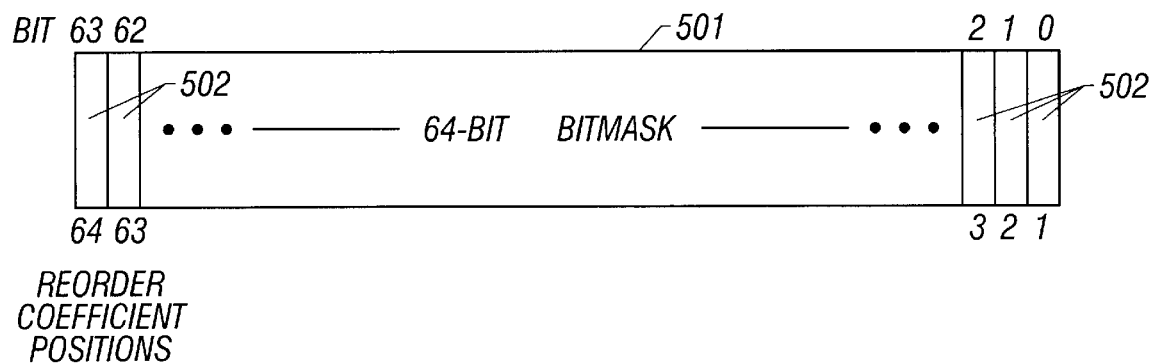
FIG. 5 illustrates the generation of a bitmask from the reordered sequence of coefficients in the registers.

In FIG. 5, the reordered coefficients which have been loaded into the XMM0–XMM7 registers and corresponding to the desired zigzag scanning order is shown. Again, it is to be appreciated that at this point the coefficient values residing within the registers can be the original coefficient numbers or the quantized coefficient values. Subsequently, a bitmask 501 is generated based on the coefficient values stored in the XMM registers. The bitmask 501 represents a pattern of zero (including near-zero) values and non-zero (including non near-zero) values.

With the coefficient values in the XMM registers, some technique is required to determine if each of these values is in the zero category or the non-zero category for coefficient values. One technique is to evaluate the value of the coefficient to determine if the value resides within a particular range. A boundary range is selected around the zero value. If the coefficient value is within a range between a selected minimum and maximum boundary values around a zero, then the coefficient is regarded as a zero (or near zero) value. That is, coefficients having values within this range are treated as zero values, while coefficients having values outside of this range are treated as non-zero coefficient values.

In one embodiment, packed data compare instructions are used to test each value of the coefficient to determine if the particular coefficient resides outside of this near zero boundary. A number of techniques can be utilized to perform the comparison of each coefficient value to determine if it is beyond the maximum or the minimum value to place the value outside of the near zero range. Thus, a variety of techniques can be implemented.

For example, one embodiment compares the register values to another register which is loaded with the maximum value at the end of the near zero range. The comparison generates a first bit value (such as setting a bit to "1") if the coefficient value is beyond the maximum boundary value or "0" if the coefficient is less or equal to the maximum boundary value. The same operation is then performed with the original coefficient value against a second register loaded with a minimum boundary value, such that bits are set if the corresponding coefficient value is less than the minimum boundary value or zero if the coefficient value is greater or equal to the minimum boundary value.

It is appreciated that the comparison can be performed bit by bit or at byte length to determine if the coefficient is a zero or a non-zero coefficient. When the comparison is done at the bit by bit level, a packed data instruction can then be used to sample the particular packed data register taking one bit from each of the values to generate an 8-bit mask for the eight coefficient values in each of the registers. In one example, each of the maskbits 502 of the bitmask 501 will be set to a value of "0" if the coefficient value is within the zero boundary range and the maskbit 502 will be set to a value of "1" if the coefficient value is outside of the zero boundary range. Accordingly, 8 maskbits 502 will be generated for each of the XMM registers.

The process is repeated for each of the XMM registers and combined sequentially to create the 64-bit bitmask 501 shown in FIG. 5. It is appreciated that instead of a single 64-bit mask, four 16-bit masks, or two 32-bit masks can be generated, as well as other combinations. For processors of the Intel Architecture Family operating at 32 bits, two 32-bit masks are generated. For processors operating at 64-bits, a single 64-bit mask is generated. What results is a bitmask in which at least one bit is used to designate if a particular coefficient is near zero or if it is non-near zero. The near zero coefficients are essentially treated as having a value of "0" by the use of this bitmask.

Figure 6:
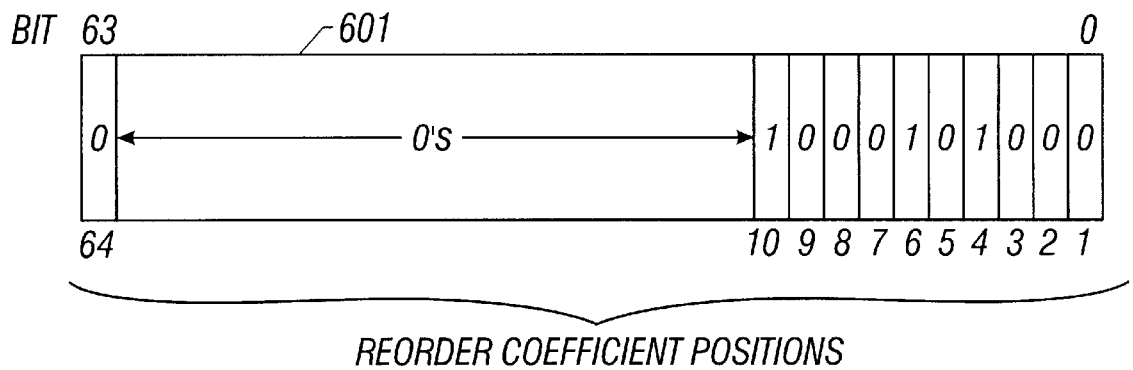
FIG. 6 illustrates an example one set of coefficients in which non-zero coefficients are present at bit positions 4, 6, and 10 only.

Referring to FIG. 6, an exemplary bitmask 601 is shown in which non-zero coefficients reside at coefficient positions 4, 6 and 10. The remaining coefficient positions have a value near zero. In the example illustrated, coefficients at positions 4, 6 and 10 have a value of 1. The other coefficients have zero values. The bitmask 601 is then utilized as an index to select those coefficient values which are not near-zero.

Figure 7:
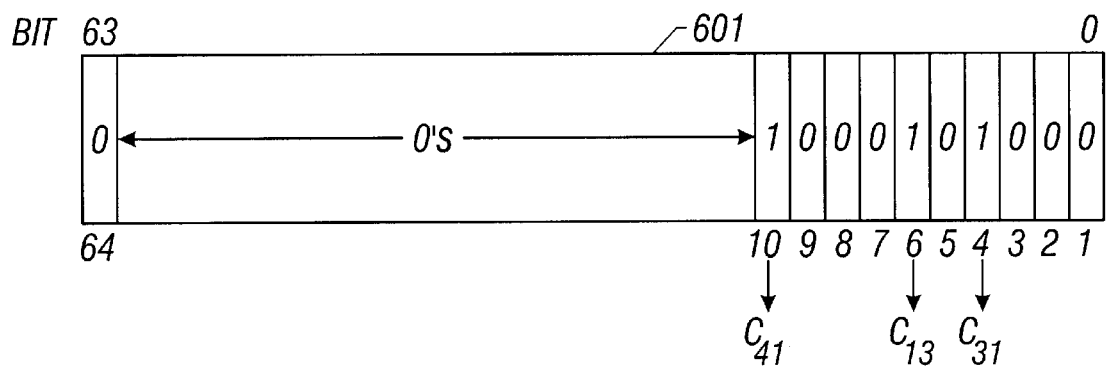
FIG. 7 illustrates the use of the bitmask of FIG. 6 as an index to select non-zero coefficient values.

As shown in FIG. 7, the bitmask 601 is used as an index to select those non-zero coefficients. In the particular example, the set bit positions shown at positions 4, 6 and 10 correspond to $C_{31}$, $C_{13}$ and $C_{41}$. The index is also used to provide the redundancy reduction encoding, which is shown in block 104 in FIG. 1. The redundancy reduction encoding in the particular instance is run length encoding in which non-zero coefficient values are provided in the encoding but the near zero values are reduced to provide the number of sequential zeros present in the reordered coefficient arrangement.

Figure 8:
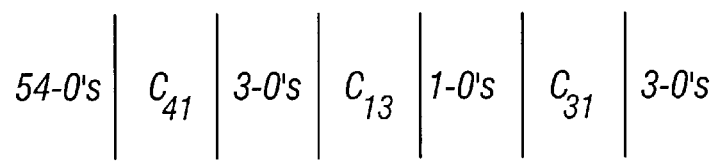
FIG. 8 shows the result of the run-length encoding performed on the bitmask of FIGS. 6 and 7.

Thus, in the example shown in FIGS. 6–8, the non-zero coefficients are located at positions 4, 6 and 10, which correspond to coefficients $C_{31}$, $C_{13}$ and $C_{41}$. The $C_{31}$ coefficient value is preceded by three zeros so that the run length encoding denotes that three zeros are present. Subsequently, one zero is present between the coefficients $C_{31}$ and $C_{13}$ at positions 4 and 6, respectively, and three zeros are present between the coefficients $C_{31}$ and $C_{41}$ which correspond to positions 6 and 10. Fifty-four zeros are noted beyond the coefficient $C_{41}$.

The run length encoding for the particular index of the bitmask 601 is shown in FIG. 8. The run length encoding denotes that three zeros are present before the coefficient $C_{31}$. The next non-near zero coefficient is $C_{13}$ and in which one zero is present between $C_{31}$ and $C_{13}$. And the last non-zero coefficient is coefficient $C_{41}$ in which three zeros are present between the two non-zero coefficients $C_{13}$ and $C_{41}$. Finally, fifty-four zeros follow the coefficient $C_{41}$.

Since the bitmask 601 identifies which coefficients will be quantized to a non-near zero value, the index is utilized to select the non-zero coefficient and these coefficients can then be quantized prior to being inserted into the run length encoding shown in FIG. 8 (if the coefficients had not been earlier quantized). A technique for deriving the indices is described below in reference to BSF and BSR instructions. Furthermore, it is appreciated that the quantization of the non-zero coefficients can be performed at various points in converting data to MPEG data out, but performing the quantization after generating the index will require only those non-zero coefficient values to be quantized. The run length encoded value is then output for additional processing to generate the final MPEG encoded stream.

Figure 9:
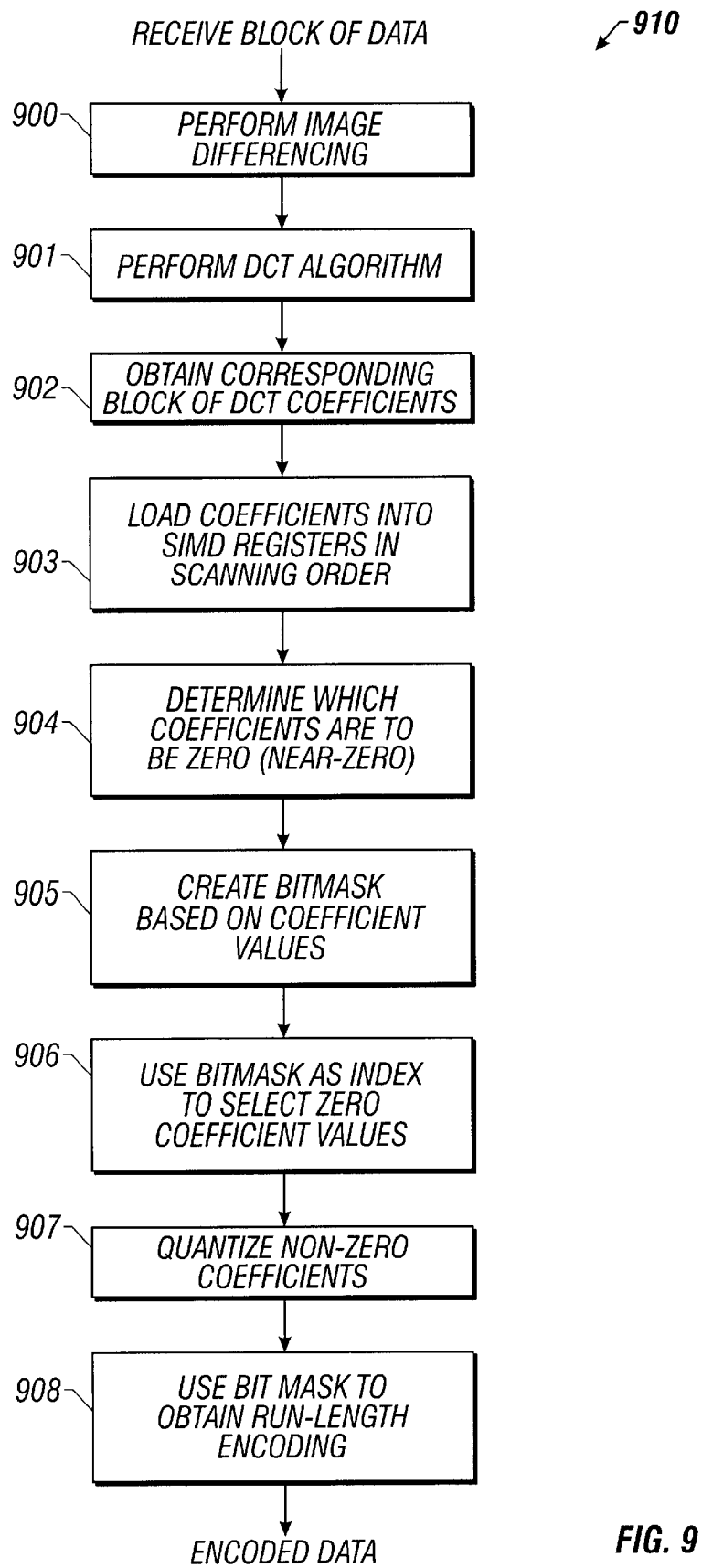
FIG. 9 illustrates a block flow diagram for executing processor instructions to perform the MPEG encoding.

The overall sequence of operations to be performed by instructions operating on a processor is shown in a flowchart 910 in FIG. 9. The digital data is received and stored as a block of data in memory. An example block is the 8×8 array of video data earlier described. In the embodiment described, an algorithm (such as the DCT algorithm) is used to transform the data to DCT coefficients (block 901), in which the coefficients are stored back into memory (block 902). Generally, some form of image differencing technique (900) is used prior to performing the DCT algorithm. Subsequently, the data is treated as packed data and loaded into packed data registers (block 903). In the example, SIMD registers are used. When the coefficients are loaded into the SIMD registers, the packed data instructions place each data or group of data into the desired scanning order. For MPEG applications, zigzag scanning order is typically employed.

Once the packed data registers hold the coefficients in the desired reordered sequence, each value is then checked to determine if it falls within a range regarded to be zero or near-zero. Those coefficients outside of the near zero boundary range are regarded as non-zero coefficients (block 904). From the determination of which coefficients are non-zero, a bitmask is created identifying which coefficient is non-zero. In one embodiment described, a bit is associated with each coefficient so that those bits identifying the non-zero coefficients are set and those coefficients which are regarded as near zero have a value of zero (block 905).

Next, the bitmask is utilized as an index to select those non-zero coefficients (block 906) which are then quantized to be used in the encoding (block 907). Then the bitmask is used to obtain a run length encoding in which near zero values are encoded to denote how many sequential zeros follow or precede the non-zero coefficient values (block 908). The encoded data comprising the non-zero coefficient and the run length of sequential zeros are output as the encoded data.

A variety of techniques are available to scan the bitmask to index and perform the run length encoding. For example, in the Intel Architecture Family, BSF (bit scan forward) and BSR (bit scan reverse) instructions are available. The BSF and BSR instructions scan a bit string in a source operand for a set bit and store the bit index of the first set bit found in a decimation register. The bit index is the offset from the least significant bit zero in the bit string to the first bit set. The BSF instruction scans the source operand low to high from bit zero (the source operand toward the most significant bit); the BSR instruction scans high to low (from the most significant bit toward the least significant bit).

Thus by using the BSF or BSR instruction (or other equivalent instructions) an efficient bit scanning is provided. The BSF and BSR instructions will return a count of how far into the register the first 1 bit is positioned relative to the low order or high order position depending on the particular instruction used. If there are no 1 bits in the register a condition flag will be set which can be tested to exit the scanning/encoding sequence.

One embodiment creates a code loop that will locate the position of the next 1 bit using either the BSF or the BSR instruction, calculate the corresponding offset to the non-zero coefficient represented by that bit and determine how many zero bit positions were skipped in locating the 1 bit. In this instance, even if a zigzag order table is utilized to look up the index to these non-zero coefficients, since so few coefficients will be non-zero it is typically not computationally costly to look up the non-zero values. When a given 1 bit is located, and the encoding information obtained, the 1 bit can then be cleared or shifted out of the register and the loop repeated for the next 1 bit and the sequence can be repeated until there are no longer any more 1 bits.

In the event the processor architecture requires several registers to be used to represent the bitmask, an outer code loop can be utilized over the several registers. For example, in the Intel Architecture Family, processors operating on the 32 bit architecture scheme (IA-32), two separate 32 bit registers would be required to process the 8×8 block of coefficients. In this event the outer loop would cycle through each of the registers. In this instance, twice. The outer loop must also handle a situation where there were extra unaccounted zero bits left in the previous bitmask after the last 1 bit. The position of the last 1 bit is noted and passed on to the next inner loop of the code to be added to the first run length of zeros from that bitmask. An example run length encoding for one 8×8 DCT coefficient block is noted below using bit scan forward instruction to perform the bit scanning.

```
// Run-length encode one 8x8 DCT coefficient block
RLEncode(pBlock, pOutBuffer)
{
    _int16          Temp[64];       //temporary zigzag order coefficient buffer
    unsigned_int32  bitmasks[2];    //2, 32 bit bitmasks
    int             one_pos;        //location of a found '1' bit
    int             index = 0;      //location to store to output buffer
    int             last = 0;       //last bit position into bitmask
    int             extra0 = 0      //extra zeros after loop finishes
    Resequence_to_zigzag_order(pBlock, &Temp);
    SIMD_test_for_zero(&Temp, &bitmasks); //bitmask bit = 0 for zero, 0 for non-zero
    //BitScanForward() returns position = 0 if it finds a bit in the lsb of the bitmask
    //Scan the first of two bitmasks (this loop often mispredicts once or sometimes twice at end)
    while (one_pos = BitScanForward(bitmask[0])) != NO_MORE_ONE_BITS)
    {
        pOutBuffer[index] = one_pos;
        last = last + one_pos +1;
        //This shows an example of using a zigzag look-up table to get the
        //location of the non-zero coefficient in the original block. The
        //coefficient could have been loaded directly from Temp[last], but
        //some implementations will not actually fill in Temp[] - merely
        //creating the bitmasks.
        pOutBuffer[index +1] = pBlock[Zigzag_Order_Table [last]];
        bitmask[0] = bitmask[0]>>(one_pos +1);//shift out old bits, shift in zeroes
        index += 2;     //next output locations
```

-continued

```
    }
    extra0 = 32 - last; //extra zeroes on end of bitmask
    last = 0;          //clear the last bitmask position counter
    // This loop frequently exits immediately for no non-zero bits, and rarely mispredicts
    while((one_pos = BitScanForward (bitmask[1])) != NO_MORE_ONE_BITS)
    {
        pOutBuffer[index] = one_pos + extra0;
        extra0 = 0;           //clear extra0 after adding it in once
        last = last + one_pos + 1;
        pOutBuffer[index + 1] = pBlock[Zigzag_Order_Table[last + 32]];
        bitmask[1] = bitmask[1]>>(one_pos + 1); //shift out old bits, shift in zeroes
        index += 2;
    }
    //store extra zeros run-length - can be zero
    OutBuffer[index] = 31 - last + extra0;
    Return;
}
```

An advantage of the invention is that significantly less branch mispredictions will result. It is to be noted that processors often use speculative execution, where the processor guesses whether a branch will be taken or not, based on recent processing of the branch, and proceeds to execute code on that assumption. If the processor mispredicts, the processor must correct for the misprediction, usually incurring substantial performance penalty, such as flushing a pipeline.

As noted previously in the background section, the prior art technique of testing the coefficients for zero or non-zero determination requires a conditional test and branch for each of the sixty-four coefficients in the 8×8 block array. This conditional branch is largely unpredictable as to whether it will be taken or not. With the prior art method of processing, the conditional branch will mispredict for nearly every non-zero coefficient and possibly also for some coefficients. The actual number of mispredictions per block will vary with the data being processed but it is reasonably expected to average four or more per 8×8 block array.

With the embodiment of the invention described above, the code loop will commonly mispredict only on the last iteration, when branch prediction will commonly predict that the loop will iterate again. It is also possible that a processor may sometimes mispredict that the loop should end earlier which then results in two mispredictions. In the instance, where two registers are required to process the bitmask (as in the example above where two 32 bit registers are utilized to process the sixty-four bits of the bitmask), the processor may mispredict. However, since the second register will very frequently represent nothing but zero coefficients, with its own conditional loop branch that branch will very rarely mispredict. So in the embodiment described having two 32-bit registers for the 64-bit index, the mispredictions for an 8×8 block of coefficients are generally kept under two per 8×8 block.

The reduction in the number of mispredictions of the pipeline by the practice of the invention reduces the number of pipeline flushes required over the prior art. A reduction in the number of pipeline flushes improves the performance of the processor to output a desired result. Thus, mispredictions in the pipeline can be reduced for appreciable performance improvement of the processor.

Figure 10:
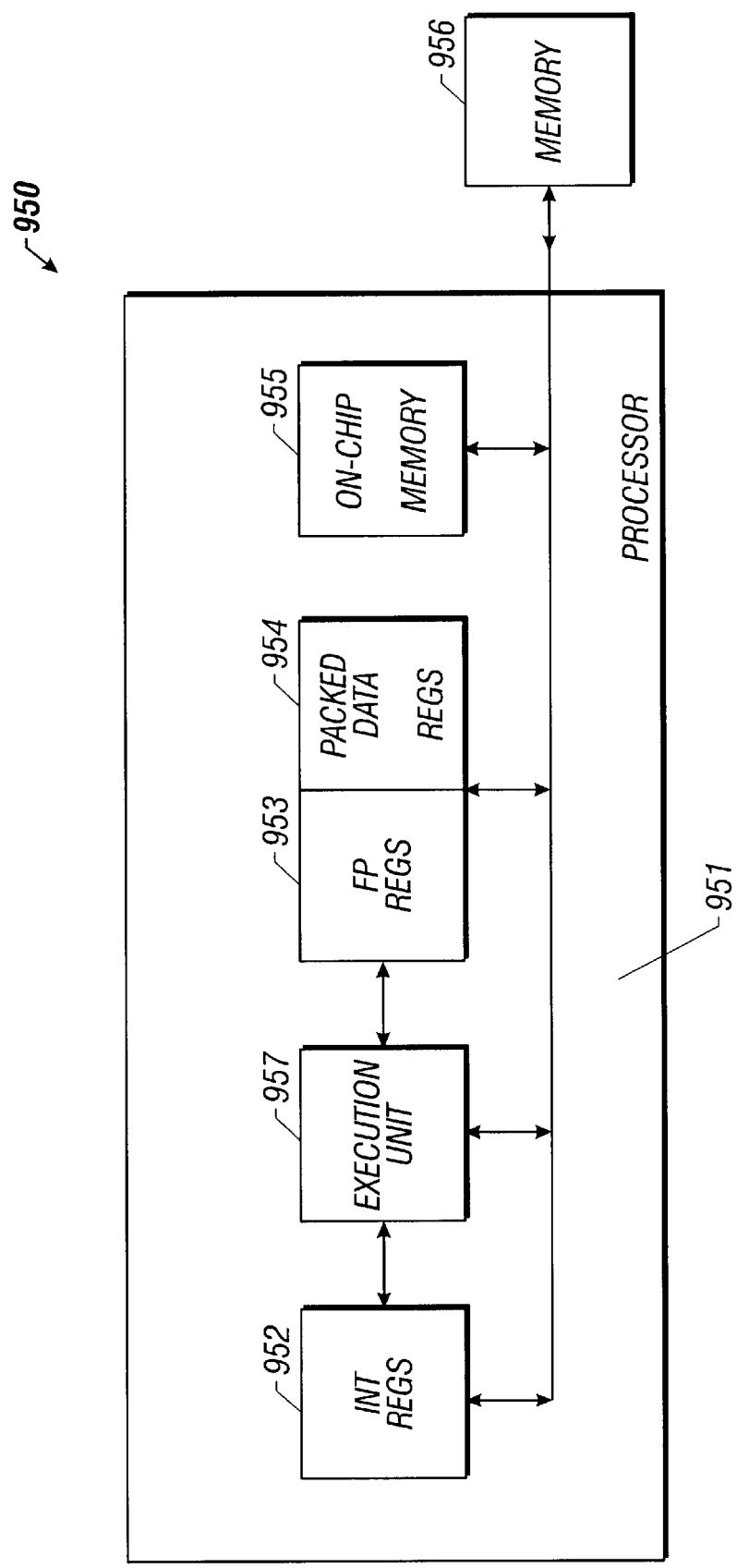
FIG. 10 illustrates an example of a computer system having a processor which performs the MPEG encoding.

Referring to FIG. 10, one typical system embodiment for practicing the invention is shown. A computer 950 is shown in which a processor 951 functions as a sole or one of a plurality of processors comprising a central processing unit (CPU) or units of a computer 950. Typically the processor 951 is embodied in a single integrated circuit chip. The processor 951 includes an execution (processing) unit 957, which may be comprised of one or more execution units. The processor 951 includes a set of integer registers 952, as well as floating point registers 953. The processor 951 can include separate packed data registers 954 or alias the floating point and packed data operations in a single set of registers.

The processor typically includes an on-chip memory 955. The on-chip memory 955 can be comprised of both cache and main memory (RAM). The off-chip memory 956 is typically comprised of main memory (but may include a cache), which also is coupled to other memory devices, such as to a disk storage medium.

In the embodiment described, the video data is received from off-chip memory 956 and utilize the integer registers 952 and/or the floating point registers 953 to perform the scalar operations in executing instructions of the DCT algorithm by the execution unit 957. The results are then stored back in memory 955 and/or 956. Subsequently, the coefficients are read from memory and loaded into the packed data registers 954 (or the floating point registers 953 if the floating point and the packed data operations alias the registers). The processor then executes the instructions for reordering the block of data as it is read from memory 955 and/or 956 into the packed data registers.

The bitmask is then generated and the results of the bitmask are stored in the integer register or registers 952. Subsequently, a bit scanning instruction (such as the aforementioned BSR or BSF instruction) is then executed to perform the operation on the bitmask stored in one or more of the registers 952. Using the index, the non-near zero coefficients are recalled from memory 955/956 (generally into the floating point registers) and the run length encoding generated using those non-zero coefficients and the number of sequential zeros noted by the bit scanning instruction.

Finally, the encoded MPEG data is then output to memory 956 for subsequent transfer. It is appreciated that the quantization can be performed at a number of different points in the sequence and that the manner in which the quantization is performed or the type of quantization performed is not critical to the understanding of the present invention. A variety of known quantization techniques can be employed.

Furthermore, it is appreciated that the instructions for operating on a machine, such as the above described processor and computer, can be located at a variety of locations or on a variety of media. For example, a machine-readable medium, such as semiconductor memory devices, magnetic disks, optical disks, etc. can readily store the instructions. Also, the instructions can be readily downloaded from a location, such as a web site accessed through the Internet, for use on a machine. Thus, a variety of means are available for making the instructions available on a machine.

In practicing the invention, a number of advantages are derived. Some of these advantages include fewer reads in reading the data from memory, fewer iterations in reordering the coefficients and identifying the number of sequential zeros for redundancy reduction encoding, as well as providing for fewer branch mispredictions for the pipeline. The advantages are not limited only to these listed.

It is appreciated that various other embodiments are available for practicing the invention. For example, one task common to many software applications is text tokenization. That is, locating and determining the length of words. To perform this task, it is desirable to skip over a variety of white-space characters (including, space, tab and end-of-line characters). The invention would allow all white-space characters to be located and generate a mask. Then a bit scanning technique can be used to alternately scan for "1"s and "0"s in the mask to quickly determine the location and length of the words. It is appreciated that other embodiments can be practiced with the present invention. Accordingly, the present invention is not limited just to MPEG encoding.

Thus, "Low Branch-Mispredict Technique for MPEG Run Length Encoding" is described.

I claim:

1. A method comprising:
   executing packed data instructions to transfer data to a register;
   creating a bitmask for the data in the register, the bitmask identifying which data elements are to correspond to a first index value and which data elements correspond to a second index value;
   indexing the data using the bitmask to locate a position of each of the first index value or the second index value;
   selecting the data based on the indexing.

2. The method of claim 1 wherein creating the bitmask includes selecting a boundary range around a reference value, in which data elements within the boundary are treated as zero values and data elements outside of the boundary are treated as non-zero values, and in which a corresponding first or second index value is assigned in the bitmask for each data element.

3. The method of claim 2 wherein indexing the data includes determining bit locations of each index value in the bitmask corresponding to a non-zero value.

4. The method of claim 3 further including encoding the data to determine a number of sequential first index values adjacent to each second index value.

5. The method of claim 4 wherein executing the packed data instructions also reorders the data when data is transferred to the register.

6. A method comprising:
   loading data into a plurality of registers using packed data instructions, in which the data is reordered from an original order to a scanning order;
   creating a bitmask for the data in the registers, the bitmask identifying which data elements have a non-zero value and which data elements have a zero or near-zero value;
   indexing the data using the bitmask to locate a position of each data element having a non-zero value;
   encoding the data based on the indexing, in which the encoding reduces sequential zero and near-zero values to a number representing a run-length of zeros next to a non-zero value.

7. The method of claim 6 wherein creating the bitmask includes selecting a boundary range around a reference value of zero, in which data elements within the boundary are treated as zero values and data elements outside of the boundary are treated as non-zero values, and in which a corresponding index value of "0" or "1" is assigned in the bitmask for each data element.

8. The method of claim 7 wherein indexing the data includes determining bit locations of each index value in the bitmask corresponding to a "1" value.

9. The method of claim 8 wherein loading the data into the registers loads coefficients of a Discreet Cosine Transform in a scanning order which tends to have zero and near-zero coefficients grouped sequentially together.

10. The method of claim 9 wherein encoding the data encodes video data to generate an output compatible with an MPEG standard.

11. The method of claim 8 wherein loading the data into the registers loads coefficients of a transform of a block of video data and in which encoding the data encodes the video data to generate an output compatible with an MPEG standard.

12. The method of claim 8 wherein indexing is achieved by executing a bit scan instruction to scan for each index value in the bitmask corresponding to a "1" value.

13. A machine-readable medium that provides instructions, which when executed by a machine, causes the machine to perform operations comprising:
   transferring data to a register using packed data instructions;
   creating a bitmask for the data in the register, the bitmask identifying which data elements are to retain its value and which data elements are to be reduced;
   indexing the data using the bitmask to locate a position of each data element retaining its value;
   encoding the data based on the indexing.

14. The machine-readable medium of claim 13 wherein creating the bitmask includes selecting a boundary range around a reference value, in which data elements within the boundary are treated as zero values and data elements outside of the boundary are treated as non-zero values, and in which a corresponding index value is assigned in the bitmask for each data element.

15. The machine-readable medium of claim 14 wherein indexing the data includes determining bit locations of each index value in the bitmask corresponding to a non-zero value.

16. The machine-readable medium of claim 15 wherein encoding the data includes determining number of sequential zero index values adjacent to each non-zero index value.

17. The machine-readable medium of claim 16 wherein transferring the data using the packed data instructions also reorders the data when data is transferred to the register.

18. A machine-readable medium that provides instructions, which when executed by a machine, causes the machine to perform operations comprising:
   loading data into a plurality of registers using packed data instructions, in which the data is reordered from an original order to a scanning order;
   creating a bitmask for the data in the registers, the bitmask identifying which data elements have a non-zero value and which data elements have a zero or near-zero value;
   indexing the data using the bitmask to locate a position of each data element having a non-zero value;

encoding the data based on the indexing, in which the encoding reduces sequential zero and near-zero values to a number representing a run-length of zeros next to a non-zero value.

19. The machine-readable medium of claim 18 wherein creating the bitmask includes selecting a boundary range around a reference value of zero, in which data elements within the boundary are treated as zero values and data elements outside of the boundary are treated as non-zero values, and in which a corresponding index value of "0" or "1" is assigned in the bitmask for each data element.

20. The machine-readable medium of claim 19 wherein indexing the data includes determining bit locations of each index value in the bitmask corresponding to a "1" value.

21. The machine-readable medium of claim 20 wherein loading the data into the registers loads coefficients of a Discreet Cosine Transform in a scanning order which tends to have zero and near-zero coefficients grouped sequentially together.

22. The machine-readable medium of claim 21 wherein encoding the data encodes video data to generate an output compatible with an MPEG standard.

23. The machine-readable medium of claim 20 wherein loading the data into the registers loads coefficients of a transform of a block of video data and in which encoding the data encodes the video data to generate an output compatible with an MPEG standard.

24. The method of claim 20 wherein indexing is achieved by executing a bit scan instruction to scan for each index value in the bitmask corresponding to a "1" value.

25. An apparatus comprising:
   a memory to store data;
   a register coupled to said memory to receive the data from said memory reordered from an original order;
   a processor coupled to said memory and register to create a bitmask for the data in the register, the bitmask to identify which data elements are to correspond to a first index value and which data elements correspond to a second value; and
   said processor to index the data using the bitmask to locate a position of each corresponding first index value or second index value to locate corresponding data elements.

26. The apparatus of claim 25 wherein said processor selects a boundary range around a reference value to create the bitmask, in which data elements within the boundary are treated as zero values and data elements outside of the boundary are treated as non-zero values, and in which corresponding index values are assigned in the bitmask for the data elements.

27. The apparatus of claim 25 wherein the data elements are video pixel data and said processor generates encoded video data compatible with an MPEG standard.

28. An processor comprising:
   a plurality of registers to operate on packed data when packed data instructions are executed, said registers to receive packed data reordered from an original order;
   an execution unit coupled to said registers to create a bitmask for the packed data in the registers, the bitmask to identify which data elements have a non-zero value and which data elements have a zero value; and
   said processor to index the packed data by use of the bitmask to locate a position of each data element having a non-zero value and encode the packed data based on the index, in which the encode reduces sequential zero values to a number representing a run-length of zeros next to a non-zero value.

29. The processor of claim 28 wherein said execution unit selects a boundary range around a reference value to create the bitmask, in which data elements within the boundary are treated as zero values and data elements outside of the boundary are treated as non-zero values, and in which a corresponding index value is assigned in the bitmask for each data element.

30. The processor of claim 28 wherein the data elements are video pixel data and said processor generates encoded video data compatible with an MPEG standard.

* * * * *